United States Patent
Koh et al.

(10) Patent No.: US 10,166,479 B1
(45) Date of Patent: *Jan. 1, 2019

(54) SYSTEM AND METHOD FOR THE PROVISION OF TIME-BASED AWARDS IN AN ONLINE GAME

(71) Applicant: Aftershock Services, Inc., San Ramon, CA (US)

(72) Inventors: James Koh, Mountain View, CA (US); Kellen Christopher Smalley, Pleasanton, CA (US)

(73) Assignee: ELECTRONICS ARTS INC., Redwood City, CA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 14/503,330

(22) Filed: Sep. 30, 2014

Related U.S. Application Data

(63) Continuation of application No. 13/709,667, filed on Dec. 10, 2012, now Pat. No. 8,851,978.

(51) Int. Cl.
*A63F 13/69* (2014.01)

(52) U.S. Cl.
CPC .................................. *A63F 13/69* (2014.09)

(58) Field of Classification Search
None
See application file for complete search history.

(56) References Cited

U.S. PATENT DOCUMENTS

| | | | |
|---|---|---|---|
| 4,858,930 A | 8/1989 | Sato | 273/85 |
| 5,267,734 A | 12/1993 | Stamper et al. | 273/434 |
| 6,238,288 B1 * | 5/2001 | Walker | G06Q 30/02 273/138.1 |
| 6,257,979 B1 * | 7/2001 | Walker | A63F 3/00157 273/292 |
| 6,331,144 B1 | 12/2001 | Walker et al. | 463/20 |
| 6,354,939 B1 * | 3/2002 | Morita | A63F 13/10 345/581 |
| 6,413,160 B1 * | 7/2002 | Vancura | A63F 9/183 463/16 |
| 7,314,411 B2 * | 1/2008 | Lannert | G06Q 30/0239 463/19 |
| 8,092,302 B2 | 1/2012 | Cuddy et al. | 463/27 |
| 8,105,157 B2 | 1/2012 | Walker et al. | 463/29 |
| 8,210,934 B2 | 7/2012 | Ocko et al. | 463/25 |
| 8,851,978 B1 | 10/2014 | Koh | |
| 2001/0024971 A1 | 9/2001 | Brossard | 463/30 |
| 2003/0064770 A1 * | 4/2003 | Kaminkow | G07F 17/32 463/16 |

(Continued)

*Primary Examiner* — Tramar Harper

(74) *Attorney, Agent, or Firm* — Knobbe, Martens, Olson & Bear, LLP

(57) ABSTRACT

A system and method are disclosed for providing stochastic, tiered awards in an online game based on a user's real-time completion of a task in the online game, where a time clock for the task begins running (in real-time) at the completion of a user's immediately previous task. The game may include a plurality of tasks, where a second task may be made performable in response to a user completing a first task. An award may be distributed to a user based on an amount of real world time taken by the user to complete the second task. A plurality of awards may be available for provision to a user. The plurality of potential awards may include various levels of potential awards.

21 Claims, 3 Drawing Sheets

(56) References Cited

U.S. PATENT DOCUMENTS

| | | | |
|---|---|---|---|
| 2003/0069832 A1* | 4/2003 | Czepluch | G06Q 30/02 |
| | | | 705/37 |
| 2003/0153379 A1* | 8/2003 | Beaulieu | G07F 17/32 |
| | | | 463/16 |
| 2003/0199305 A1* | 10/2003 | Mathis | G07F 17/32 |
| | | | 463/20 |
| 2004/0204990 A1* | 10/2004 | Lee | G06Q 30/02 |
| | | | 705/14.13 |
| 2005/0255914 A1 | 11/2005 | McHale et al. | 463/31 |
| 2006/0030407 A1 | 2/2006 | Thayer | 463/42 |
| 2008/0009346 A1 | 1/2008 | Jessop et al. | 463/31 |
| 2008/0015004 A1* | 1/2008 | Gatto | G07F 17/32 |
| | | | 463/16 |
| 2010/0035678 A1 | 2/2010 | Antoniades | 463/23 |
| 2010/0120498 A1 | 5/2010 | Cuddy et al. | 463/20 |
| 2012/0122586 A1 | 5/2012 | Kelly et al. | 463/42 |
| 2013/0072283 A1 | 3/2013 | Chang et al. | 463/20 |

* cited by examiner

SYSTEM AND METHOD FOR THE PROVISION OF TIME-BASED AWARDS IN AN ONLINE GAME

CROSS REFERENCE TO RELATED APPLICATIONS

The present application is a continuation of U.S. patent application Ser. No. 13/709,667, filed Dec. 10, 2012, entitled "System and Method for the Provision of Time-Based Awards in an Online Game", the disclosure of which is incorporated herein by reference in its entirety.

FIELD

The disclosure relates to an online-game that allows the provision of stochastic, tiered awards based on a user's real-time completion of a task in the online game, where a time clock for the task begins running (in real-time) at the completion of a user's immediately previous task.

BACKGROUND

Various techniques for providing awards to users based on game play exist. Conventional gaming systems may provide randomly selected awards in a progressively tiered awards system. Other conventional systems may provide awards based on an amount of total time a user spent engaging in the online game. Yet other conventional systems may impose penalties for failing to complete an action in an online game within a pre-determined time frame relative to the game. Conventional systems, however, suffer from various drawbacks and inefficiencies relating to providing incentives for a user to engage in continuous play and rewarding less time spent away from the game. For example, conventional systems may fail to base the provision of awards based on a user's real-time completion of a task, where a time clock for the task begins (in real-time) at the completion of the user's immediately prior task.

SUMMARY

One aspect of the disclosure relates to the provision of stochastic, tiered awards in an online game based on a user's real-time completion of a task in the online game, where a time clock for the task begins running (in real-time) at the completion of a user's immediately previous task. The game may include a plurality of tasks, where a second task may be made performable in response to a user completing a first task. An award may be distributed to a user based on an amount of real world time taken by the user to complete a task. A plurality of potential awards may be available for provision to a user. The plurality of potential awards may include various levels of potential awards. In distributing an award to a user, a level of potential awards associated with the user may be determined, and an award from that associated level may be selected to be distributed to the user. The award from the associated level may be randomly selected, selected based on an amount of real world time taken by the user to complete the task, and/or selected based on other criteria. An amount of real world time to complete the task may be determined by starting running a clock that measures real world time at the completion of first task and re-starting the running of the clock at the completion of the second task. The determination of awards based on real-world time, rather than some form of game-based time, may incentivize users remaining engaged with a game performing game activities to receive awards of greater value.

A system configured to provide awards in an online game based on a completion time of a task in the game may include one or more processors configured to execute compute program modules. The program modules may comprise a space module, a task management module, a clock management module, an award management module, and/or other modules.

The space module may be configured to execute an instance of a virtual space. The space module may be configured to implement the instance of the virtual space to facilitate participation by one or more users in a game within the virtual space by determining view information that facilitates presentation of views of the virtual space to the one or more users by one or more client computing platforms. The game may include a series of tasks that are performable by the one or more users within the virtual space. The series of tasks may comprise a first task and a second task, where the second task may become performable by the user responsive to the user completing the first task.

The task management module may be configured to determine whether a user has completed a task. The task management module may be configured, responsive to completion of a task, to make a subsequent task performable responsive to the completion of the task. For example, the task management module may be configured to determine whether a user completed a first task. In response to the user completing the first task, the task management module may be configured to make a second task performable by the user. The task management module may be configured to determine that the user has completed the second task. In response to the user completing the second task, the task management module may be configured to make a third task performable by the user. The task management module may be configured to determine that the user has completed the third task.

The clock management module may be configured to determine an amount of real world time between completion of the first task and completion of the second task by the user. For example, the clock management module may be configured to start running of a clock that measures real world time at the completion of the first task and re-start the running of the clock at the completion of the second task.

The award management module may be configured to determine an award for from a plurality of potential awards for a user as an award for completing a task. For example, the award management module may be configured to determine a first award from a plurality of potential awards for the user as an award for completing the first task. The award management module may be configured to distribute the first award to the user within the virtual space. The award management module may be configured to determine a second award from the plurality of potential awards for the user as an award for completing the second task. The second award may be determined based on an amount of real world time between completion of the first task and completion of the second task by the user. The award management module may be configured to distribute the second award to the user within the virtual space. The plurality of potential awards may comprise, for example, provision of one or more respect points to the user, provision of a pre-determined amount of virtual currency to the user, provision of a virtual item to the user, instantiation of a buff, establishment of a relationship with the user's character, provision of access for the user to an area that was not previously accessible to the user, impact to a character with whom the user has a relationship, modification of a subsequent task for the user, provision of a time bonus to the user, where the time bonus may comprise a reduction of amount of time to complete a task, changing a level of potential awards associated with the user, and/or other potential awards.

In some implementations, the plurality of potential awards may comprise a plurality of levels of potential awards. A level of potential awards may comprise one or more potential awards. The award management module may be configured to determine a level of potential awards associated with the user and select an award from the associated level of potential awards for the user. In some implementations, the award management module may randomly select the award from the associated level of potential awards, may select the award based on an amount of real world time between completion of the first task and completion of the second task by the user, and/or may select the award based on other criteria. The first level of potential awards may comprise a first set of potential awards for a first user and a second set of potential awards different from the first set of potential awards for a second user.

In some implementations, a computer-implemented method of providing awards in an online game based on a completion time of a task in the game may be implemented in a computer system comprising one or more physical processors. The method may comprise executing an instance of a virtual space; implementing the instance of the virtual space to facilitate participation by one or more users in the game within the virtual space by determining view information that facilitates presentation of views of the virtual space to the one or more users by one or more client computing platforms, wherein the game includes a series of tasks that are performable by the one or more users within the virtual space, the series of tasks comprising a first task and a second task, the second task becoming performable by the user responsive to the user completing the first task; determining the user has completed the first task; making the second task performable by the user in response to the user completing the first task; determining a first award from a plurality of potential awards for the user as an award for completing the first task; distributing the first award to the user within the virtual space; determining the user has completed the second task; determining an amount of real world time between completion of the first task and completion of the second task by the user; determining a second award from the plurality of potential awards for the user as an award for completing the second task, wherein the second award is determined based on the amount of real world time between completion of the first task and completion of the second task by the user; and distributing the second award to the user within the virtual space.

In some implementations a non-transitory electronic storage media may store information related to providing awards in an online game based on a completion time of a task in the game. The stored information may comprise a memory configured to store information related to one or more users of an online game, information related to a plurality of potential awards, and instructions configured to cause a client computing platform to: execute an instance of a virtual space; implement the instance of the virtual space to facilitate participation by one or more users in the game within the virtual space by determining view information that facilitates presentation of views of the virtual space to the one or more users by one or more client computing platforms, wherein the game includes a series of tasks that are performable by the one or more users within the virtual space, the series of tasks comprising a first task and a second task, the second task becoming performable by the user responsive to the user completing the first task; determine the user has completed the first task; make the second task performable by the user in response to the user completing the first task; determine a first award from a plurality of potential awards for the user as an award for completing the first task; distribute the first award to the user within the virtual space; determine the user has completed the second task; determine an amount of real world time between completion of the first task and completion of the second task by the user; determine a second award from the plurality of awards for the user as an award for completing the second task, wherein the second award is determined based on the amount of real world time between completion of the first task and completion of the second task by the user; and distribute the second award to the user within the virtual space.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
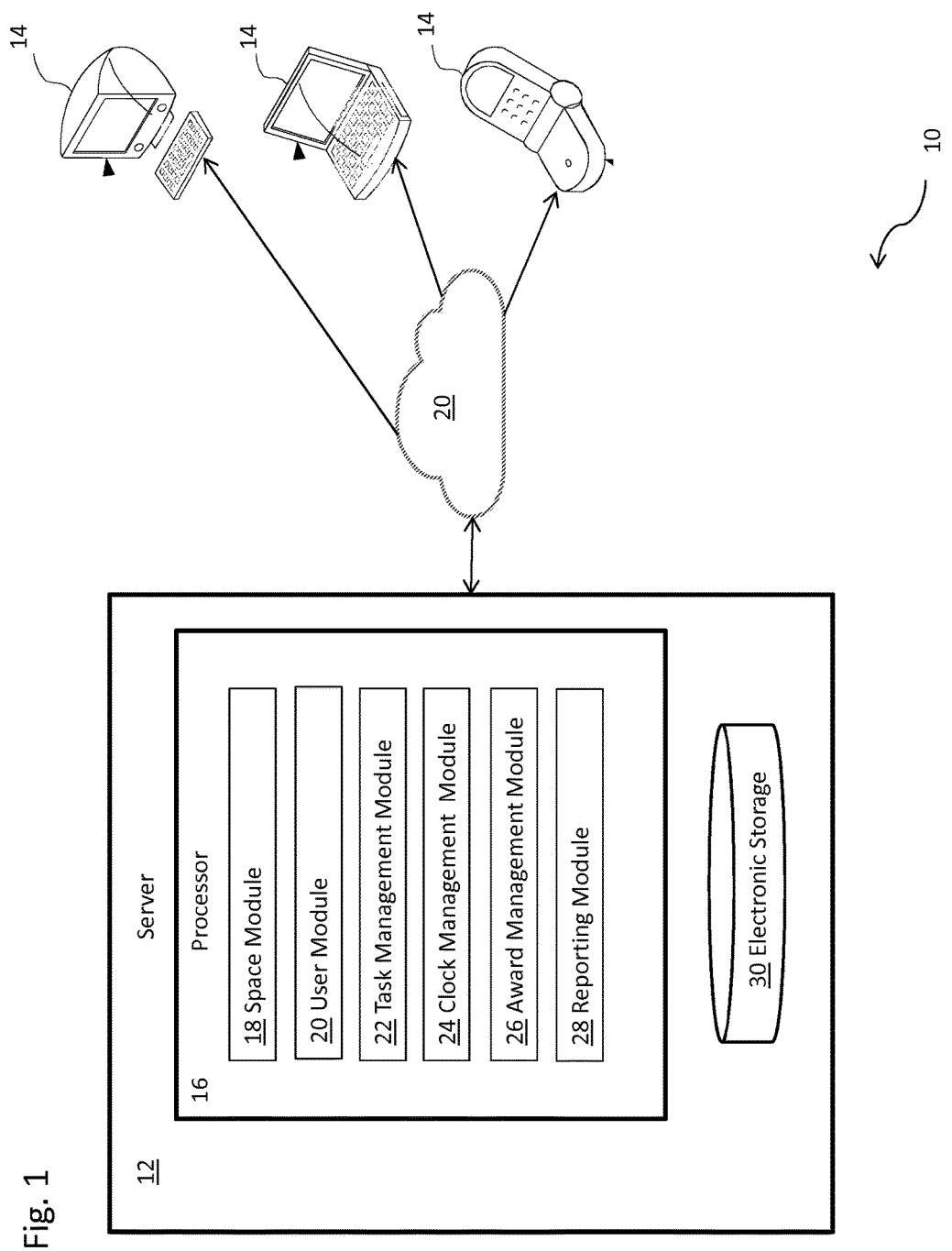
FIG. 1 illustrates a system configured to provide awards to users of an online game.

FIG. 1 illustrates a system 10 configured to provide awards in an online game in a virtual space. System 10 may be configured to provide the virtual space to the users over a network (e.g., network 20). Providing the virtual space may include hosting the virtual space over network 20. System 10 may be configured to provide stochastic, tiered awards in an online game based on a user's real-time completion of a task in the online game, where a time clock for the task begins running (in real-time) at the completion of a user's immediately previous task. The game may include a plurality of tasks, where a second task may be made performable in response to a user completing a first task. An award may be distributed to a user based on an amount of real world time taken by the user to complete a task. A plurality of awards may be available for provision to a user. The plurality of potential awards may include various levels of potential awards. In distributing an award to a user, a level of potential awards associated with the user may be determined, and an award from that associated level may be selected to be distributed to the user. The award from the associated level may be randomly selected, selected based on an amount of real world time taken by the user to complete the task, and/or selected based on other criteria.

The amount of real world time to complete the task may be determined by starting running a clock that measures real world time at the completion of first task and re-starting the running of the clock at the completion of the second task.

In some implementations, system 10 may include a server 12. The server 12 may be configured to communicate with one or more client computing platforms 14 according to a client/server architecture. One or more users may access system 10 and/or the virtual space via client computing platforms 14.

Server 12 may be configured to execute one or more computer program modules. The computer program modules may include one or more of a space module 18, a user module 20, a task management module 22, a clock management module 24, an award management module 26, a reporting module 28, and/or other modules.

Space module 18 may be configured to implement the instance of the virtual space executed by the computer modules to facilitate participation by one or more users in a game within the virtual space by determining view information that facilitates presentation of views of the virtual space to the one or more users. The view information may then be communicated (e.g., via streaming, via object/position data, and/or other information) from server 12 to client computing platforms 14 for presentation to users. The view information determined and transmitted to a given client computing platform 14 may correspond to an entity being controlled by a user via the given client computing platform 14. The view information determined and transmitted to a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 18 is not intended to be limiting. Space module 18 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 18, users may control entities to interact with the virtual space and/or each other. The entities may include one or more of characters, objects, simulated physical phenomena (e.g., wind, rain, earthquakes, and/or other phenomena), and/or other elements within the virtual space. User-controlled characters may include avatars. As used herein, an entity may refer to an object (or group of objects) present in the virtual space that represents an individual user. The entity may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Control over the entities may be exercised by the users through control inputs and/or commands input through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through space module 18).

Within the virtual space, one or more users may participate in a game. The game may include a series of tasks that are performable by the one or more users within the virtual space. The series of tasks may comprise a first task and a second task, where the second task may become performable by the user responsive to the user completing the first task. The game may include tasks in which users (or their entities) are adversaries, and/or tasks in which users (or their entities) are allies. The game may include tasks in which users (or their entities) are adversaries of non-user characters, and/or tasks in which users (or their entities) are allies of non-user characters. In the game, entities controlled by the user may obtain points, virtual currency or other virtual items, experience points, levels, and/or other demarcations indicating experience and/or success. Space module 18 may be configured to perform the functions associated with the game in executing the instance of the virtual space.

User module 20 may be configured to access and/or manage one or more user accounts associated with users of system 10. The user accounts may include user information. The one or more user accounts and/or user information may include information stored by server 12, one or more of the client computing platforms 14, storage 30, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, award information (e.g., information related to one or more awards received by the user for completing one or more respective tasks; one or more levels of awards associated with the user; potential awards associated with the one or more levels of awards associated with the user, etc.) demographic information associated with users, interaction history among users in the virtual space, information stated by users, activity information of users, browsing history of users, a client computing platform identification associated with a user, a phone number associated with a user, user settings, and/or other information related to users. The user information may include and/or indicate an activity level of the user. The activity level may include previous login time(s), previous logout time(s), login frequency, time spent logged in, and/or other activity information. The user information may also include information related to purchases in or for the virtual space. Such information may include, for example, activity information for individual transactions, a spend rate, a total spend amount, and/or other information related to user purchases.

As will be discussed further below, users may participate in the virtual space by controlling entities within the virtual space. The user information in the user accounts may include information related to the entities controlled by the users in the virtual space. Such information may include, for example, an entity type, an entity class, an entity identification, a level, inventory information, status information, and/or other information related to entities controlled by users in the virtual space.

Task management module 22 may be configured to determine whether a user has completed a task and to make a subsequent task performable responsive to the completion of the task. A task may be associated with one or more predetermined goals in the online game. For example, task management module 22 may be configured to determine whether a user has completed a first task. The task management module 22 may be configured to determine that the user completed the first task by determining that the user achieved the one or more predetermined goals associated with the first task. For example, the predetermined goals may comprise one or more of: reaching a level in the game, obtaining one or more predetermined virtual items in the game, establishing a relationship with another entity in the game, establishing a relationship with a non-user character in the game, traveling to a specific destination in the game, obtaining a predetermined amount of virtual currency in the game, winning a battle in the game, obtaining a predetermined piece of land in the game, and/or other types of predetermined goals. In response to the user completing the first task, the task management module 22 may be configured to make a second task performable by the user. The task management module 22 may be configured to determine that the user has completed the second task. For example, the task management module 22 may be configured to determine that the user completed the second task by determining that the user achieved the one or more predetermined goals associated with the second task. In response to the user completing the third task, the task management module 22 may be configured to make a third task performable by the user. The task management module 22 may be configured to determine that the user has completed the third task. For example, the task management module 22 may be configured to determine that the user completed the third task by determining that the user achieved the one or more predetermined goals associated with the third task. The number and/or types of predetermined goals associated with a task may be based on the task being completed, the user completing the task, an amount of time taken by the user to complete prior tasks, and/or other criteria.

The clock management module 24 may be configured to determine an amount of real world time taken by a user to complete a task. For example, the clock management module 24 may be configured to determine an amount of real world time between completion of the first task and completion of the second task by the user. For example, the clock management module 24 may be configured to start running of a clock that measures real world time at the completion of the first task and re-start the running of the clock at the completion of the second task. In some implementations, the clock management module 24 may be configured to work in concert with the task management module 22. For example, in response to the task management module 22 determining that the user has completed a task, the clock management module 24 may note an amount of real world time taken to complete that task and may restart the running of the clock. The clock management module 24 may store an amount of real world time taken by the user to complete the task in the storage 30. The amount of real world time may be associated with the task, the user that completed the task, the one or more predetermined goals associated with the task, and/or other information related to the task.

The award management module 26 may be configured to determine an award from a plurality of potential awards for the user as an award for completing a task. For example, the award management module 26 may be configured to determine a first award from the plurality of potential awards for the user as an award for completing a first task. The award management module 26 may be configured to determine a second award from the plurality of potential awards for the user as an award for completing a second task. The award management module 26 may be configured to determine the award based on the amount of real world time taken by the user to complete the task for which the award is determined.

In some implementations, the plurality of potential awards may comprise a plurality of levels of potential awards. The award management module 26 may be configured to determine a level of potential awards associated with the user and select an award from the associated level of potential awards for the user. Selection of an award from a level may be stochastic. For example, the award management module 26 may be configured to determine the level of potential awards for the user based on one or more of: an amount of real world time taken by the user to complete the task for which the award is determined, user account information of the user, random selection, and/or other criteria. In some implementations, the level of the award may be adjusted stochastically. In such implementations, the level of awards determined by award management module 26 may be increased (e.g., within a certain limit) or decreased (e.g., within a certain limit) from a level determined based on an amount of real-world time it took the user to complete the task.

A level of potential awards associated with a user may comprise one or more potential awards for distribution to the user. In some implementations, the award management module 26 may select an award from the associated level of potential awards for distribution to the user based on one or more of: an amount of real world time taken by the user to complete the task for which the award is determined, user account information of the user, random selection, and/or other criteria.

The potential awards available to a user may be customized based on one or more of user preference, historical experience regarding use of previously distributed awards to the user, system valuations of the respective potential awards to the user, and/or other customization criteria. The potential awards available at various levels to a user may be customized based on one or more of the customization criteria.

Figure 2:
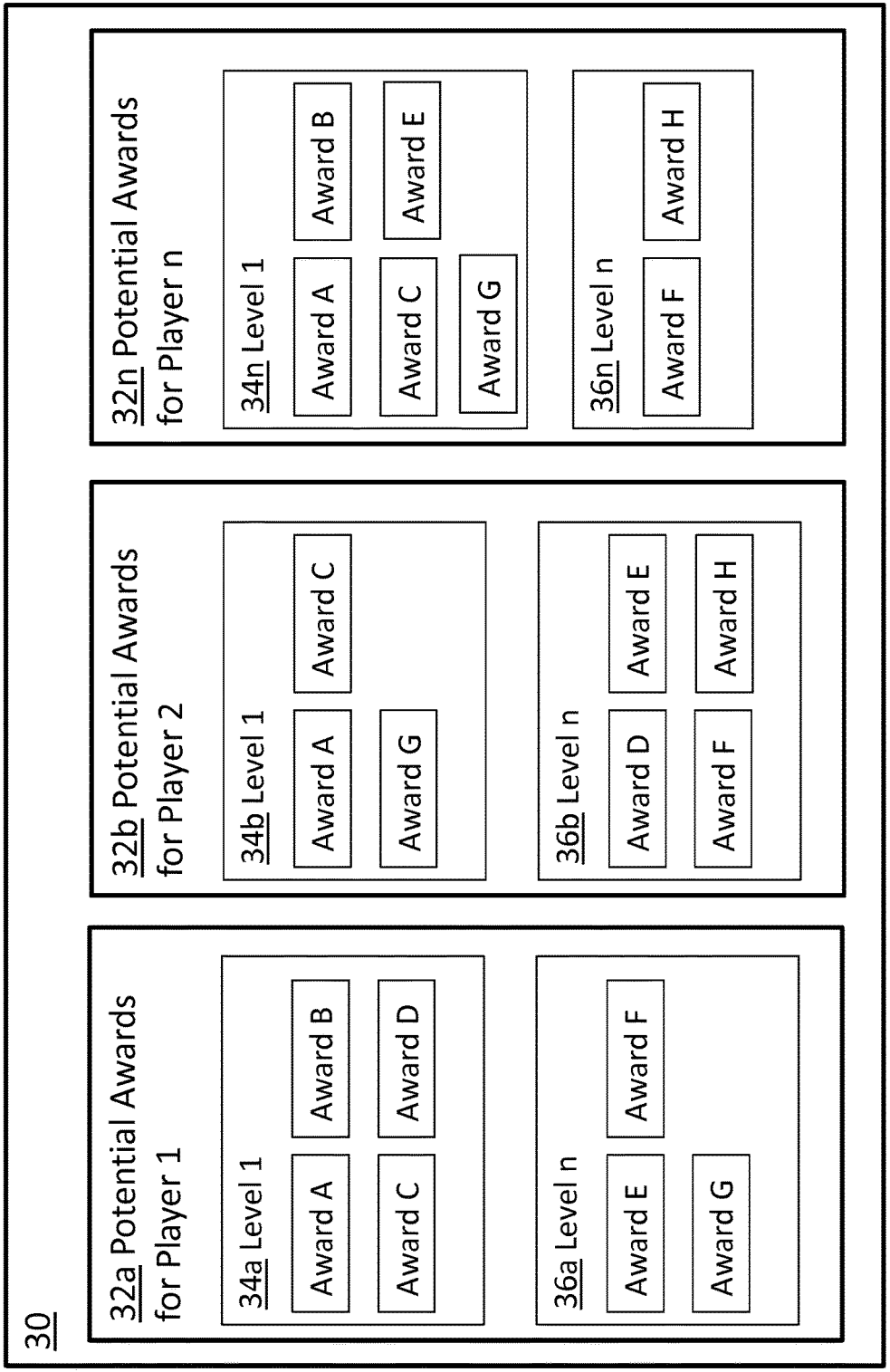
FIG. 2 illustrates an exemplary storage of information related to plurality of potential awards available to users.

In some implementations, the first level of potential awards may comprise a first set of potential awards for a first user and a second set of potential awards different from the first set of potential awards for a second user. The number and/or types of potential awards stored for a first user at a level of potential awards may differ from a number and/or types of potential awards stored for a second user at that level of potential awards. For example, as shown in FIG. 2, storage 30 may store exemplary potential awards available for one or more users. Storage 30 may store potential awards for a user 1 (e.g., item 32a), potential awards for a user 2 (e.g., item 32b), and potential awards for a user n (e.g., item 32n). For example, the storage 30 may store one or more awards (e.g., awards A, B, C, and D) for user 1 at a first level of awards (e.g., item 34a) and may store one or more awards (e.g., awards E, F, and G) at a nth level of awards (e.g., item 36a). In another example, the storage 30 may store one or more awards (e.g., awards A, C, and G) for user 2 at a first level of awards (e.g., item 34b) and may store one or more awards (e.g., awards D, E, F, and H) at a nth level of awards (e.g., item 36b). The storage 30 may store one or more awards (e.g., awards A, B, C, E, and G) for user n at a first level of awards (e.g., item 34n) and may store one or more awards (e.g., awards F, and H) at a nth level of awards (e.g., item 36n). Other numbers and/or types of potential awards and levels of potential awards may be available for distribution to users.

In some implementations, the plurality of potential awards may comprise, for example, provision of one or more respect points to the user, provision of a pre-determined amount of virtual currency to the user, provision of a virtual item to the user, instantiation of a buff, establishment of a relationship with the user's character, provision of access for the user to an area that was not previously accessible to the user, impact to a character with whom the user has a relationship, modification of a subsequent task for the user, provision of a time bonus to the user, where the time bonus may comprise a reduction of amount of time to complete a task, changing a level of potential awards associated with the user, and/or other potential awards.

Returning to FIG. 1, the award management module 26 may be configured to distribute the selected award to the user. In some implementations, the award management module 26 may be configured to distribute the award to the user within the virtual space. For example, when the selected award comprises provision of a virtual item, the award management module 26 may be configured to distribute the virtual item to a virtual inventory of the user in the game. When the selected award comprises provision of a predetermined amount of virtual currency, for example, the award management module 26 may be configured to distribute the virtual currency to the virtual currency account of the user. When the selected award comprises a change of level of potential awards associated with the user, for example, the award management module 26 may be configured to update the awards information of the user account of the user to reflect the distribution of the award. When the selected award comprises instantiation of a buff, for example, the award management module 26 may be configured to coordinate with the space module 26 to effect the instantiation of the buff in the implementation of the virtual space. The award management module 26 may be configured to effect various types of distribution based on the type of award selected for the user. The distributions of the selected awards are not limited to the examples described herein.

The reporting module 28 may be configured to provide and/or display one or more reports based on information related to the online game, information stored at storage 30, and/or other information related to system 10. For example, the reporting module 28 may be configured to facilitate analysis and report information related to system usage, user activity, task management, clock management, award management, and/or other stored information. The reporting module 28 may be configured to produce statistics regarding the stored information and may be configured to prepare and/or display reports including one or more parts of the stored information. For example, the reporting module 28 may be configured to prepare and or display one or more reports including information related to the distribution of awards to one or more users related to one or more tasks, information related to the average time for users to complete a specific task or set of tasks, information related to variations in time for one or more users to complete a specific task or set of tasks, information related to all potential awards available to users, information related to the potential awards available to one or more users, information related to subsets of potential awards available at one or more levels to one or more users, and/or other types of reports.

In some implementations, the reporting module 28 may be configured to display one or more reports to a user via a user interface. In some implementations, the user interface may be accessed via various channels such as, for example, a webpage, a web portal, an agent (such as a software and/or hardware module) executing on server 12, electronic mail and/or other communication channels that can be used to present the comparisons to a user. In some implementations, the system 10 may present a link to a display of one or more reports prepared by the reporting module 28.

Server 12 and/or client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be operatively linked via some other communication media.

A given client computing platform 14 may include one or more processors configured to execute computer program modules. The computer program modules may be configured to enable an expert or user associated with the given client computing platform 14 to interface with server 12, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Server 12 may include electronic storage 30, one or more processors 16, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information non-transiently. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14, and/or other information that enables server 12 to function as described herein.

Processor(s) 16 may provide information processing capabilities within server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is not intended to be limiting, as processor 16 may include a plurality of processors operating in coordination or cooperation. This may include implementations in which server 72 includes a multi-processor device, a farm of server devices operating together, and/or virtual resources provided by the cloud. The processor 16 may be configured to execute modules 18, 20, 22, 24, 26, and/or 28. Processor 16 may be configured to execute modules 18, 20, 22, 24, 26, and/or 28 by software; hardware; firmware; some combination of software, hardware, and/or firmware; and/or other mechanisms for configuring processing capabilities on processor 16.

It should be appreciated that although modules 18, 20, 22, 24, 26, and/or 28 are illustrated in FIG. 1 as being co-located within a single processing unit, in implementations in which processor 16 includes multiple processing units, one or more of modules 18, 20, 22, 24, 26, and/or 28 may be located remotely from the other modules. The description of the functionality provided by the different modules 18, 20, 22, 24, 26, and/or 28 described below is for illustrative purposes, and is not intended to be limiting, as any of modules 18, 20, 22, 24, 26, and/or 28 may provide more or less functionality than is described. For example, one or more of modules 18, 20, 22, 24, 26, and/or 28 may be eliminated, and some or all of its functionality may be provided by other ones of modules 18, 20, 22, 24, 26, and/or 28. As another example, processor 16 may be configured to execute one or more additional modules that may perform some or all of the functionality attributed below to one of modules 18, 20, 22, 24, 26, and/or 28.

Figure 3:
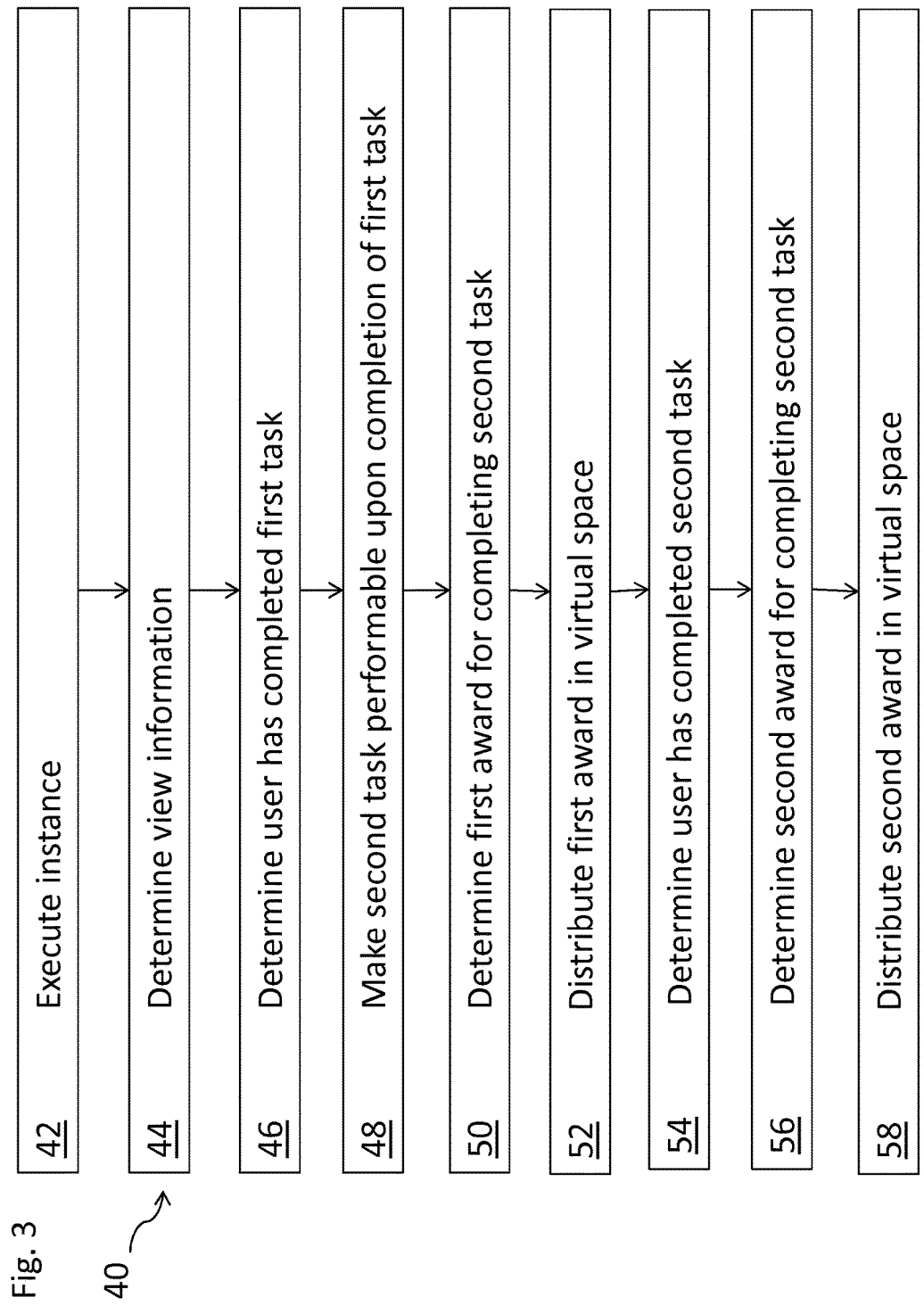
FIG. 3 illustrates an exemplary method of providing an award to a user of an online game.

FIG. 3 illustrates a method 40 of providing an award for a user in an online game. The operations of method 40 presented below are intended to be illustrative. In some embodiments, method 40 may be accomplished with one or more additional operations not described, and/or without one or more of the operations discussed. Additionally, the order in which the operations of method 40 are illustrated in FIG. 3 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a space module the same as or similar to space module 18 (shown in FIG. 1 and described above).

At an operation 44, the executed instance of the virtual space may be implemented to determine view information. The view information may define views to be presented to users via client computing platforms. In some implementations, operation 44 may be performed by a space module the same as or similar to space module 18 (shown in FIG. 1 and described above).

At an operation 46, completion of the first task by a user may be determined. In some implementations, operation 46 may be performed by a task management module the same as or similar to task management module 22 (shown in FIG. 1 and described above).

At an operation 48, a second task may be made performable by the user in response to the determination that the user completed the first task. In some implementations, operation 46 may be performed by a task management module the same as or similar to task management module 22 (shown in FIG. 1 and described above).

At an operation 50, a first award may be determined for the user based on the determination that the user completed the first task. In some implementations, operation 58 may be performed by an award management the same as or similar to award management module 26 (shown in FIG. 1 and described above).

At an operation 52, the first award may be distributed to the user in the virtual space. In some implementations, operation 52 may be performed by an award management the same as or similar to award management module 26 (shown in FIG. 1 and described above).

At an operation 54, completion of the second task by the user may be determined. In some implementations, operation 54 may be performed by a task management module the same as or similar to task management module 22 (shown in FIG. 1 and described above).

At an operation 56, a second award may be determined for the user based on the determination that the user completed the second task. In some implementations, operation 56 may be performed by an award management the same as or similar to award management module 26 (shown in FIG. 1 and described above).

At an operation 58, the second award may be distributed to the user in the virtual space. In some implementations, operation 58 may be performed by an award management the same as or similar to award management module 26 (shown in FIG. 1 and described above).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of providing awards for participating in a time-based task in a virtual space to be executed on a computer having one or more physical processors programmed with computer program instructions that, when executed by the one or more physical processors, program the computer to perform the method, the method comprising:

executing an instance of a virtual space;

implementing the instance of the virtual space to facilitate participation by one or more users within the virtual space by determining view information that facilitates presentation of views of a virtual topography of the virtual space to the one or more users by one or more client computing platforms, wherein the virtual space is configured to facilitate interaction of a user's virtual entity with the virtual topography of the virtual space, virtual objects within the virtual topography of the virtual space, non-player characters within the virtual topography of the virtual space, and/or virtual entities of other users within the virtual topography of the virtual space by performing operations in the virtual space in response to commands received over a network from the client computing platforms associated with the individual virtual entities of the one or more users, wherein the users include a first user, and the first user controls a first virtual entity to perform actions in the virtual space;

determining whether the first user has participated in a first task;

making a second task performable by the first virtual entity in response to the user participating in the first task, wherein the second task is a predefined goal for the first virtual entity to complete by performing virtual actions within the virtual space;

determining the user has participated in the second task;

determining an amount of real world time between participation by the user in the first task and participation by the user in the second task;

determining a second award from a plurality of potential awards for the user as an award for participating in the second task, wherein individual ones of the plurality of potential awards have an associated value to the user, and wherein the second award is determined based on the amount of real world time between participation by the user in the first task and participation by the user in the second task, such that as the amount of real world time between participation by the user in the first task and participation by the user in the second task increases, the associated value to the user of the second award for participating in the second task decreases; and distributing the second award to the user within the virtual space.

2. The method of claim 1, wherein the plurality of potential awards comprises: provision of one or more respect points to the user; provision of a pre-determined amount of virtual currency to the user; provision of a virtual item to the user; instantiation of a buff; establishment of a relationship with the user's character; provision of access for the user to an area that was not previously accessible to the user; impact to a character with whom the user has a relationship; modification of a subsequent task for the user; or provision of a time bonus to the user, the time bonus comprising a reduction of amount of time to complete a task in which the user is participating.

3. The method of claim 1, wherein the plurality of potential awards comprises a plurality of levels of potential awards, each of the plurality of levels of potential awards comprising one or more potential awards.

4. The method of claim 3, wherein determining the second award for the user comprises:

determining a level among the plurality of levels of potential awards to be associated with the user;

selecting an award from the associated level of potential awards for the user.

5. The method of claim 4, wherein selecting the award from the associated level of potential awards comprises randomly selecting the award from the associated level of potential awards.

6. The method of claim 4, wherein selecting the award from the associated level of potential awards comprises selecting the award based on the amount of real world time between participation of the first task and participation of the second task by the user.

7. The method of claim 3, wherein the plurality of potential awards comprises:

changing the level of potential awards associated with the user.

8. The method of claim 3, wherein the first level of potential awards comprises a first set of potential awards for the user and a second set of potential awards different from the first set of potential awards for a second user.

9. The method of claim 1, wherein determining the amount of real world time between participation of the first task and participation of the second task by the user comprises:

starting running of a clock that measures real world time at the start of participation of the first task by the user;

re-starting the running of the clock at the start of participation of the second task by the user.

10. The method of claim 1, wherein the first task is associated with a first award, the method further comprising:

making a third task performable by the user in response to the user participating in the second task;

determining the user has participated in the third task;

determining an amount of real world time between participation by the user in the second task and participation by the user in the third task;

determining a third award from the plurality of potential awards for the user as an award for participating in the third task, wherein the third award is determined based on the amount of real world time between participation by the user in the second task and participation by the user in the third task, such that as the amount of real world time between participation by the user in the second task and participation by the user in the third task increases, the associated value to the user of the third award decreases; and distributing the third award to the user within the virtual space.

11. A system configured to provide awards for participating in a time-based task in a virtual space, the system comprising:

one or more processors configured by machine readable instructions to:

execute an instance of a virtual space, and to implement the instance of the virtual space to facilitate participation by one or more users in the virtual space by determining view information that facilitates presentation of views of a virtual topography of the virtual space to the one or more users by one or more client computing platforms, wherein the virtual space is configured to facilitate interaction of a user's virtual entity with the virtual topography of the virtual space, virtual objects within the virtual topography of the virtual space, non-player characters within the virtual topography of the virtual space, and/or virtual entities of other users within the virtual topography of the virtual space by performing operations in the virtual space in response to commands received over a network from the client computing platforms associated with the individual virtual entities of the one or more users, wherein the users include a first user, and the first user controls a first virtual entity to perform actions in the virtual space;

determine whether the first user has participated in a first task;

make a second task performable by the first virtual entity in response to the user participating in the first task, wherein the second task is a predefined goal for the first virtual entity to complete by performing virtual actions within the virtual space;

determine the user has participated in the second task;

determine an amount of real world time between participation by the user in the first task and participation by the user in the second task;

determine a second award from a plurality of potential awards for the user as an award for participating in the second task, wherein individual ones of the plurality of potential awards have an associated value to the user, and wherein the second award is determined based on the amount of real world time between participation by the user in the first task and participation by the user in the second task, such that as the amount of real world time between participation of the first task and participation of the second task increases, the associated value to the user of the second award for participating in the second task decreases; and distribute the second award to the user within the virtual space.

12. The system of claim 11, wherein the plurality of potential awards comprises: provision of one or more respect points to the user; provision of a pre-determined amount of virtual currency to the user; provision of a virtual item to the user;

instantiation of a buff; establishment of a relationship with the user's character; provision of access for the user to an area that was not previously accessible to the user; impact to a character with whom the user has a relationship; modification of a subsequent task for the user; or provision of a time bonus to the user, the time bonus comprising a reduction of amount of time to complete a task in which the user is participating.

13. The system of claim 11, wherein the plurality of potential awards comprises a plurality of levels of potential awards, each of the plurality of levels of potential awards comprising one or more potential awards.

14. The system of claim 13, wherein the one or more processors are further configured by machine readable instructions to:

determine a level among the plurality of levels of potential awards to be associated with the user;

select an award from the associated level of potential awards for the user.

15. The system of claim 14 further comprising:

randomly selecting the award from the associated level of potential awards.

16. The system of claim 14, further comprising:

select the award based on the amount of real world time between completion of the first task and completion of the second task by the user.

17. The system of claim 13, wherein the plurality of potential awards comprises:

changing the level of potential awards associated with the user.

18. The system of claim 13, wherein the first level of potential awards comprises a first set of potential awards for the user and a second set of potential awards different from the first set of potential awards for a second user.

19. The system of claim 11, wherein the one or more processors are further configured by machine readable instructions to:

start running of a clock that measures real world time at the start of participation in the first task by the user; and, re-start the running of the clock at the start of participation in the second task by the user.

20. The system of claim 11, wherein the first task is associated with a first award, and the one or more processors are further configured by machine readable instructions to:

make a third task performable by the user in response to the user participating in the second task; and determine that the user has participated in the third task;

determine an amount of real world time between participation by the user in the second task and participation by the user in the third task; and determine a third award from the plurality of potential awards for the user as an award for participating in the third task, wherein the third award is determined based on the amount of real world time between participation by the user in the second task and participation by the user in the third task, such that as the amount of real world time between participation by the user in the second task and participation by the user in the second task increases, the associated value to the user of the third award for participating in the second task decreases; and distribute the third award to the user within the virtual space.

21. A non-transitory electronic storage media storing information related to providing awards for participating in a time-based task in a virtual space, the stored information comprising:

a memory configured to store information related to one or more users of an online game and information related to a plurality of potential awards, wherein individual ones of the plurality of potential awards have an associated value to the user;

instructions configured to cause a client computing platform to:

execute an instance of a virtual space;

implement the instance of the virtual space to facilitate participation by one or more users in the virtual space by determining view information that facilitates presentation of views of a virtual topography of the virtual space to the one or more users by one or more client computing platforms, wherein the virtual space is configured to facilitate interaction of a user's virtual entity with the virtual topography of the virtual space, virtual objects within the virtual topography of the virtual space, non-player characters within the virtual topography of the virtual space, and/or virtual entities of other users within the virtual topography of the virtual space by performing operations in the virtual space in response to commands received over a network from the client computing platforms associated with the individual virtual entities of the one or more users, wherein the users include a first user, and the first user controls a first virtual entity to perform actions in the virtual space;

determine whether the first user has participated in a first task;

make a second task performable by the first virtual entity in response to the user participating in the first task, wherein the second task is a predefined goal for the first virtual entity to complete by performing virtual actions within the virtual space;

determine a first award from the plurality of potential awards for the user as an award for participating in the first task;

distribute the first award to the user within the virtual space;

determine the user has participated in the second task;

determine an amount of real world time between participation by the user in the first task and participation by the user in the second task;

determine a second award from the plurality of awards for the user as an award for participating in the second task, wherein the second award is determined based on the amount of real world time between participation by the user in the first task and participation by the user in the second task, such that as the amount of real world time between participation by the user in the first task and participation by the user in the second task increases, the associated value to the user of the second award for participating in the second task decreases; and distribute the second award to the user within the virtual space.

* * * * *